United States Patent [19]
Kleinhenz et al.

[11] Patent Number: 5,968,306
[45] Date of Patent: Oct. 19, 1999

[54] HEAT SEAL APPARATUS

[75] Inventors: William R. Kleinhenz; Michael Williamson, both of Westerville, Ohio

[73] Assignee: Owens Corning Fiberglas Technology, Inc., Summit, Ill.

[21] Appl. No.: 09/083,733

[22] Filed: May 22, 1998

Related U.S. Application Data

[62] Division of application No. 08/756,417, Nov. 26, 1996, Pat. No. 5,755,923.

[51] Int. Cl.$^6$ ........................................... B30B 5/00
[52] U.S. Cl. ..................... 156/290; 156/308.4; 156/309.6
[58] Field of Search ..................... 156/368, 580, 156/583.1, 583.4, 290, 308.2, 308.4, 309.6; 493/189, 206

[56] References Cited

U.S. PATENT DOCUMENTS

| | | | |
|---|---|---|---|
| 3,662,512 | 5/1972 | Zelnick | 53/30 |
| 3,667,598 | 6/1972 | Zelnick et al. | 206/65 S |
| 3,701,229 | 10/1972 | Zelnick | 53/22 A |
| 3,791,100 | 2/1974 | Monaghan | 53/74 |
| 3,791,101 | 2/1974 | Monaghan | 53/210 |
| 3,836,828 | 9/1974 | Siegel | 317/146 |
| 3,912,575 | 10/1975 | Zelnick | 156/515 |
| 3,967,433 | 7/1976 | Bonfiglioli | 53/30 R |
| 4,044,529 | 8/1977 | Zelnick | 53/198 R |
| 4,063,400 | 12/1977 | Millevoi | 53/180 R |
| 4,177,622 | 12/1979 | Siegel et al. | 53/511 |
| 4,185,443 | 1/1980 | Budzyn | 53/550 |
| 4,369,878 | 1/1983 | Millevoi | 198/807 |
| 4,388,796 | 6/1983 | Zelnick | 53/441 |
| 4,458,470 | 7/1984 | Fine | 53/502 |
| 4,548,024 | 10/1985 | Fine | 53/502 |
| 4,999,081 | 3/1991 | Buchanan | 156/515 |
| 5,016,426 | 5/1991 | Davis | 53/554 |
| 5,282,349 | 2/1994 | Siegel | 53/433 |
| 5,341,623 | 8/1994 | Siegel | 53/433 |
| 5,386,752 | 2/1995 | Siegel | 83/30 |
| 5,439,550 | 8/1995 | Ballestrazzi et al. | 156/515 |
| 5,755,923 | 5/1998 | Kleinhenz et al. | 156/583.4 |

*Primary Examiner*—James Sells
*Attorney, Agent, or Firm*—Inger H. Eckert

[57] ABSTRACT

An apparatus is provided for creating a heat seal in polymeric film packaging material located between adjacent bundles of one or more workpieces. The apparatus comprises a support frame and a conveyor system associated with the support frame for receiving a plurality of spaced-apart bundles of one or more workpieces and moving the bundles along a first path extending from a first portion of the support frame to a second portion of the support frame. The spaced-apart bundles are at least partially wrapped in polymeric film material as they move along the first path such that sections of the film material extend between adjacent, spaced-apart bundles. The apparatus further includes a heat seal device for effecting a heat seal in the polymeric film material located between the adjacent bundles. The heat seal device includes a carriage, first servo-drive apparatus for effecting movement of the carriage back and forth along a portion of the first path, a first seal bar assembly mounted on the carriage for movement toward and away from the first path, second servo-drive apparatus for effecting movement of the first seal bar assembly toward and away from the first path, and processor apparatus for controlling the operation of the first and second servo-drive apparatuses.

18 Claims, 13 Drawing Sheets

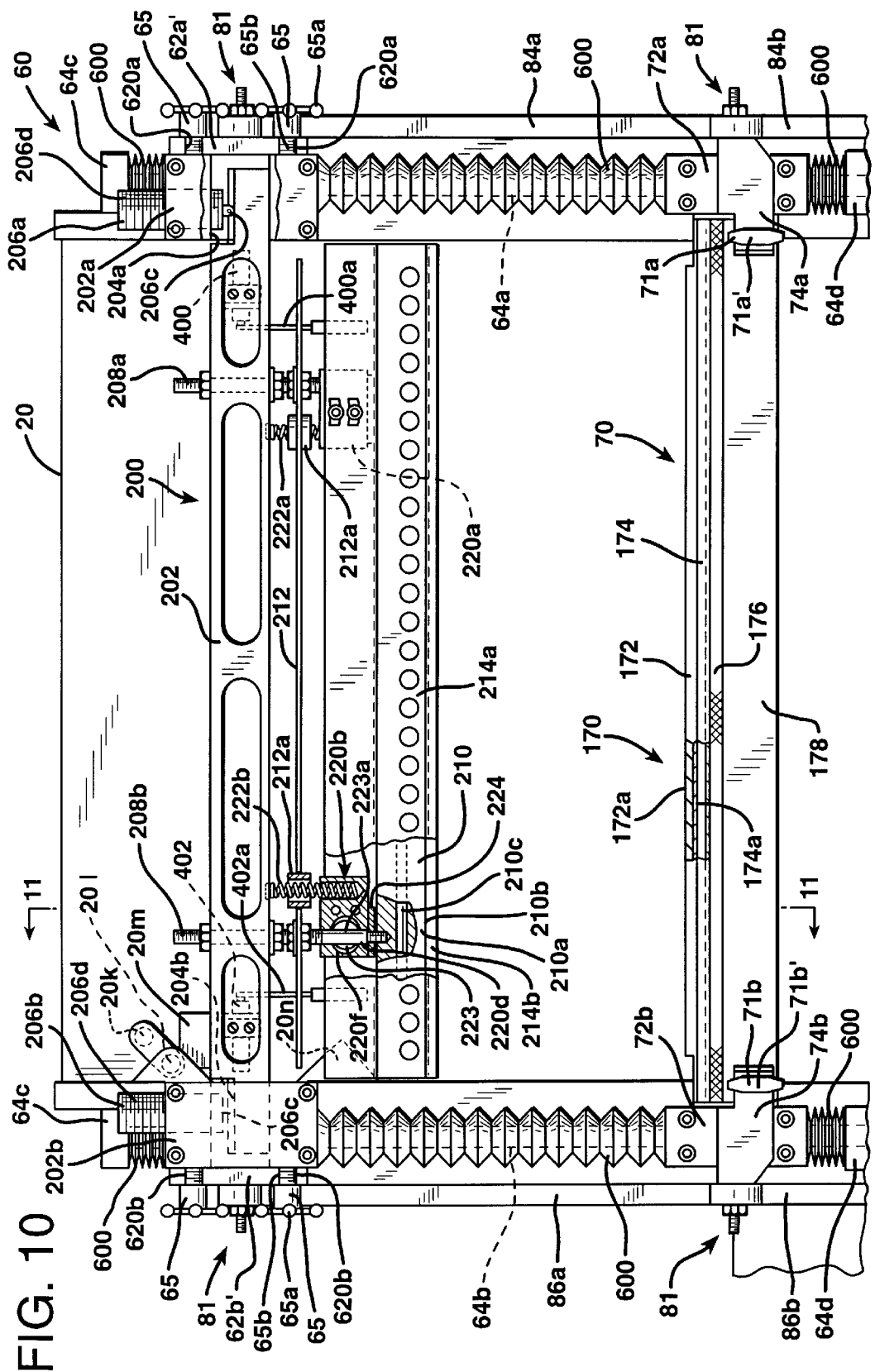

HEAT SEAL APPARATUS

This is a divisional application of U.S. patent application Ser. No. 08/756,417, filed Nov. 26, 1996, U.S. Pat. No. 5,755,923.

TECHNICAL FIELD AND INDUSTRIAL APPLICABILITY OF THE INVENTION

The present invention relates to an apparatus for creating a heat seal in polymeric film packaging material located between adjacent bundles of one or more workpieces and, more particularly, to such an apparatus which includes servo-drive apparatus for effecting movement of a heat seal bar and an anvil.

BACKGROUND OF THE INVENTION

Apparatuses for creating heat seals in sections of polymeric film packaging material located between adjacent bundles of one or more workpieces are known in the art. One such apparatus includes a support frame, a conveyor system for moving bundles of workpieces along a generally horizontal first path extending from a first end of the support frame to a second end of the support frame, and a heat seal device mounted on the support frame for creating heat seals in sections of the polymeric film material located between adjacent bundles. The heat seal device includes a carriage which is horizontally movable back and forth along a portion of the first path. A heat seal bar and anvil are mounted to the carriage for vertical movement toward and away from the first path and one another such that when the heat seal bar and anvil capture film material located between them they create a heat seal in the film material.

Horizontal movement of the carriage back and forth along the first path and vertical movement of the heat seal bar and anvil toward and away from the first path is effected via one or more conventional DC motors and mechanical elements including, e.g., one or more cams. The horizontal movement of the carriage and the vertical movement of the heat seal bar and the anvil are defined by the mechanical elements. Thus, once the shape and profile of the mechanical elements have been formed, the path along which the carriage moves and the paths along which the heat seal bar and anvil move, which latter two paths have both horizontal and vertical components, are substantially fixed and can only be changed by physically removing the old mechanical elements and substituting new mechanical elements having different shapes and profiles in their place. Accordingly, this drive arrangement has been found to be disadvantageous as it provides for very little versatility.

Accordingly, there is a need for an improved heat seal apparatus having a drive arrangement which allows the horizontal movement of the heat seal carriage and the vertical movement of the heat seal bar and anvil to be easily changed such that the paths along which the heat seal bar and anvil travel can be easily varied.

SUMMARY OF THE INVENTION

This need is met by the present invention wherein an apparatus for creating heat seals in sections of polymeric film packaging material located between adjacent bundles of one or more workpieces such as roofing shingles is provided and includes servo-drive apparatus for effecting movement of its heat seal carriage, heat seal bar and anvil. The servo-drive apparatus is very versatile and as such permits the horizontal movement of the heat seal carriage and the vertical movement of the heat seal bar and anvil to be easily and independently controlled and varied relative to one another. As a result, the paths along which the heat seal bar and anvil travel relative to the frame 20 can be easily changed. That is, the present invention allows the paths through which the heat seal bar and the anvil travel to be changed electronically rather than through the removal of a first set of mechanical elements and the subsequent substitution of a different set of mechanical elements in their place. Because the paths through which the heat seal bar and the anvil travel can be changed electronically, bundles of different lengths and widths can be easily accommodated and heat seal cycle times can be increased or decreased while the dwell time, i.e., the time that the heat seal bar and anvil actually engage the polymeric film material, remains constant or is changed.

In accordance with a first aspect of the present invention, an apparatus is provided for creating a heat seal in polymeric film packaging material located between adjacent bundles of one or more workpieces. The apparatus comprises a support frame and a conveyor system associated with the support frame for receiving a plurality of spaced-apart bundles of one or more workpieces and moving the bundles along a first path extending from a first portion of the support frame to a second portion of the support frame. The spaced-apart bundles are at least partially wrapped in polymeric film material as they move along the first path such that sections of the film material extend between adjacent, spaced-apart bundles. The apparatus further includes a heat seal device for effecting a heat seal in the sections of polymeric film material located between the adjacent bundles. The heat seal device includes a carriage, first servo-drive apparatus for effecting movement of the carriage back and forth along a portion of the first path, a first seal bar assembly mounted on the carriage for movement toward and away from the first path, second servo-drive apparatus for effecting movement of the first seal bar assembly toward and away from the first path, and processor apparatus for controlling the operation of the first and second servo-drive apparatuses. The heat seal device further includes a second seal bar assembly mounted on the carriage for movement toward and away from the first path and the first seal bar assembly.

The second servo-drive apparatus preferably comprises a second servomotor device and first and second linkage assemblies which are coupled to the second servomotor device and the first and second seal bar assemblies for effecting movement of the first and second seal bar assemblies toward and away from the first path and one another. The first linkage assembly comprises first and second connecting rods which are coupled respectively to the first and second seal bar assemblies and to a first crank arm via aircraft bearings. A second crank arm is coupled to the second servomotor device. A third connecting rod is coupled to the first and second crank arms via aircraft bearings. The second linkage assembly comprises fourth and fifth connecting rods which are coupled respectively to the first and second seal bar assemblies and to a third crank arm via aircraft bearings. A transfer shaft is coupled to and extends between the first and third crank arms.

The first seal bar assembly preferably comprises first and second upper mounting elements which are coupled to the first and fourth connecting rods via aircraft bearings, and a top seal bar assembly which is releasably coupled to the first and second upper mounting elements. The first and second upper mounting elements are adapted to move along associated vertical guide shafts.

The top seal bar assembly preferably comprises: first and second upper mounting brackets; first and second securement members coupled to the first and second upper mounting brackets and adapted to releasably lock the first and second upper mounting brackets to the first and second upper mounting elements; an upper cross beam received in first and second recesses provided in the first and second upper mounting brackets; first and second spring biasing elements associated with the first and second upper mounting brackets for engaging the cross beam and urging the cross beam downwardly within the first and second recesses; first and second studs fixedly coupled to the cross beam; an upper heat seal bar fixedly coupled to the studs; first and second seal bar shields; first and second shield connecting blocks which slidably engage the studs and are fixedly connected to the first and second bar shields; and first and second biasing elements which engage respectively the first and second blocks and the cross beam for urging the first and second blocks along with the first and second bar shields in a direction away from the cross beam.

The first and second shield connecting blocks have first and second vertical bores and first and second horizontal bores extending through them. The first and second horizontal bores receive respectively first and second stock members having bores therein. The first and second studs extend through the vertical bores in the connecting blocks and the bores in the first and second stock members.

The support frame, in the illustrated embodiment, comprises first, second, third and fourth vertical support members, a first horizontal guide shaft extending between the first and second vertical support members and a second horizontal guide shaft extending between the third and fourth vertical support members.

The carriage preferably comprises a carriage frame, first and second sets of vertical guide shafts coupled to the carriage frame and first and second horizontal linear bearing assemblies which are coupled to the carriage frame and associated with the first and second horizontal guide shafts. The first horizontal bearing assembly includes a first tubular bearing section which is adapted to be received on the first horizontal guide shaft and first and second sets of support plates which are coupled to the carriage frame and are adapted to be releasably secured to the first tubular bearing section. The second bearing assembly includes a second tubular bearing section which is adapted to be received on the second horizontal guide shaft and third and fourth sets of support plates which are coupled to the carriage frame and are adapted to be releasably secured to the second tubular bearing section.

Preferably, the first servo-drive apparatus comprises a first servomotor device, a first sprocket coupled to the first servomotor device, a second sprocket, a drive belt extending about the first and second sprockets, and a clamping device coupled to the carriage frame and the drive belt to effect movement of the carriage frame as the servomotor device rotates.

In the illustrated embodiment, the support frame further includes first and second sets of bellows which are fitted over the first and second horizontal guide shafts and coupled to the first and second linear bearing assemblies and the first, second, third and fourth vertical support members for preventing dust and other contaminates for reaching the horizontal guide shafts.

The second seal bar assembly preferably comprises: first and second anvil bearing plates which are adapted to move along the vertical guide shafts; first and second anvil brackets coupled respectively to the first and second anvil bearing plates; and, a lower anvil which is releasably coupled to the first and second anvil brackets. The lower anvil includes a channel member having a polymeric layer located therewith, an intermediate plate positioned below the channel member and having a heating element extending along its longitudinal length, a thermal insulation layer positioned below the intermediate plate, and a lower beam member positioned below the insulation layer.

The conveyor system may comprise a plurality of first idler rollers located on the support frame and the carriage; a plurality of second idler rollers located on the support frame and the carriage; first and second drive rollers positioned on the support frame; infeed belts which extend about the first idler rollers and the first drive roller; outfeed belts which extend about the second idler rollers and the second drive roller; and, a drive motor for effecting rotation of the first and second drive rollers.

The support frame preferably includes at least one belt adjustment mechanism for varying the tension of one of the infeed and outfeed belts.

The conveyor system may further include a clutch mechanism for causing the second drive roller to dwell for a predetermined period of time to allow slack to occur within the section of the polymeric material to be heat sealed such that heat sealing of that section can take place without causing stretching or damage to the section.

The support frame may include at least one carriage overtravel sensor for generating an overtravel signal which is received by the processor apparatus when the carriage has traveled beyond a predefined point along the first path. The support frame may also include a seal bar assembly overtravel sensor for generating an overtravel signal which is received by the processor apparatus when the first seal bar assembly has traveled beyond a predefined point along the vertical guide shafts.

The heat seal device may further include at least one shield sensor for generating a stop signal which is received by the processor apparatus when the seal bar shield is deflected upwardly. A disable sensor may also be provided which generates a signal to the processor apparatus indicating to the processor apparatus that the first seal bar assembly has moved within a predefined distance of the second seal bar assembly such that the processor apparatus should ignore a subsequently generated stop signal generated by the shield sensor.

In accordance with a second aspect of the present invention, a heat seal apparatus is provided for creating a heat seal in polymeric film material comprising a support frame and a heat seal device for effecting a heat seal in polymeric film material which moves along a first path extending from one portion of the support frame to a second portion of the support frame. The heat seal device includes a carriage which moves along at least a portion of the first path, a first seal bar assembly mounted on the carriage for movement toward and away from the first path, servo-drive apparatus for effecting movement of the carriage back and forth along the first path and for effecting movement of the first seal bar assembly toward and away from the first path, and processor apparatus for controlling the operation of the servo-drive apparatus. The heat seal device may also include a second seal bar assembly mounted on the carriage for movement toward and away from the first path and the first seal bar assembly.

Accordingly, it is an object of the present invention to provide an apparatus for creating heat seals in sections of polymeric film packaging material located between adjacent bundles of one or more workpieces and including servo-drive apparatus for effecting movement of a heat seal carriage, heat seal bar and anvil. It is a further object of the present invention to provide a highly reliable and long lasting heat sealing apparatus which can be operated at high cycle rates. These and other objects of the present invention will be apparent from the following description, the accompanying drawings and the appended claims.

BRIEF DESCRIPTION OF THE DRAWINGS

FIG. 10 is a view taken along view line 10—10 in FIG. 5;

DETAILED DESCRIPTION AND PREFERRED EMBODIMENTS OF THE INVENTION

Figure 1:
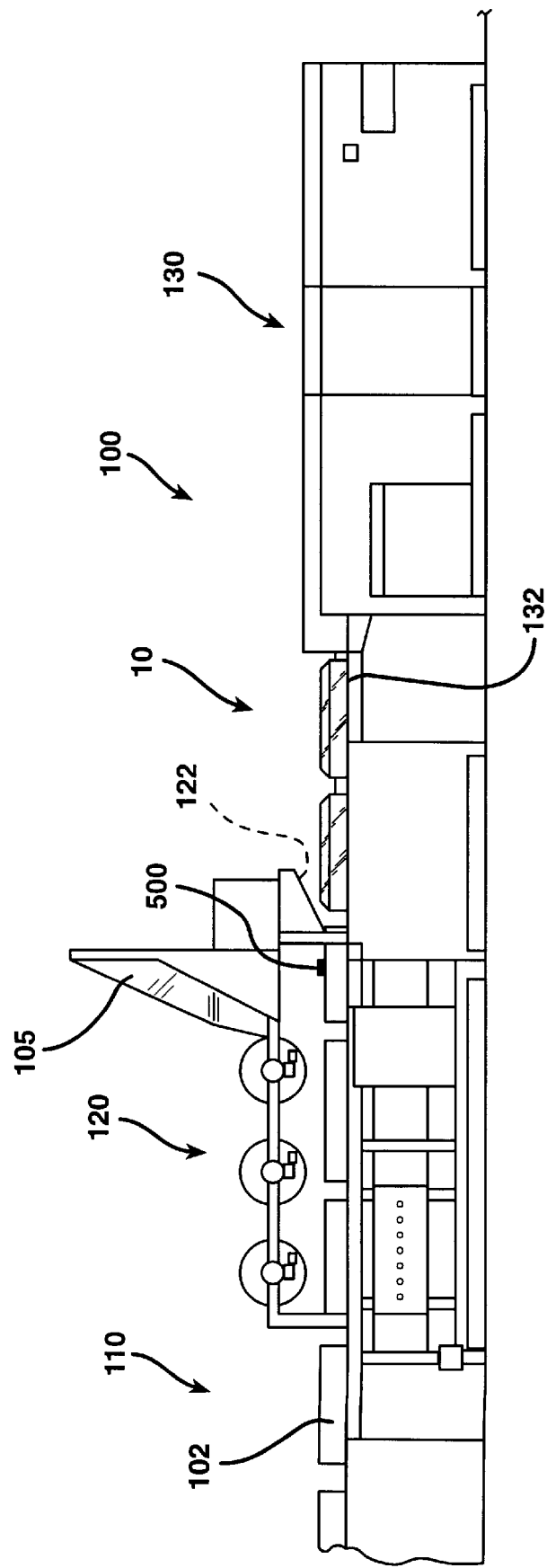
FIG. 1 is a schematic side view of a packaging line having a heat seal apparatus constructed in accordance with the present invention.

A heat seal apparatus 10 constructed in accordance with the present invention is adapted to form part of a packaging line, such as the one illustrated schematically in FIG. 1 and designated by the reference numeral 100. The packaging line 100 is intended to encase bundles of workpieces 102, such as roofing shingles, in sealed sections of conventional polymeric film packaging material 105.

The packaging line 100 receives a consistent flow of the bundles 102 from a conventional high lug conveyor 110. The bundles 102 are received from the high lug conveyor 110 by a payout stand 120 which preferably spaces the bundles 102 a predetermined distance from one another, e.g., 6.5 inches. One known payout stand 120 which is capable of being used in combination with the heat seal apparatus 10 is commercially available from Weldotron Corp., 1432 South Washington Ave., Piscataway, N.J. under the product designation Model No. 4528. The spaced bundles 102 then pass through a conventional static folding shoe or plow 122, which may be fixedly connected to one or both of the payout stand 120 and the heat seal apparatus 10. The polymeric film material 105 is formed into a tube by the plow 122 such that the bundles 102 are fed into the tube of film material 105. The polymeric film material 105 is wrapped completely about the spaced-apart bundles 102 such that there is a longitudinal seam extending along the underside of the tube of film material 105.

The heat seal apparatus 10 of the present invention effects transverse heat seals in sections of the film material 105 located between the bundles 102. Thus, each bundle 102, upon exiting the heat seal apparatus 10, is encased in a bag of polymeric film material 105 having transverse heat seals at its opposite ends which close off the bag at its ends. The heat seal apparatus 10 also partially or completely transversely severs the sections of the film material 105 located between the bundles 102.

A forced hot air tunnel 130 is located downstream from the heat seal apparatus 10. The tunnel 130 includes a conveyor 132 that pulls the wrapped bundles 102 one by one from the heat seal apparatus 10 at a speed which is faster than the speed at which the bundles 102 are delivered to the tunnel 130 by the heat seal apparatus 10. If the film material 105 between two adjacent bundles 102 has not been completely severed by the heat seal apparatus 10, the conveyor 132, by pulling the first of the two adjacent bundles 102 at a speed which exceeds the speed at which the second bundle 102 is moving, causes the film material to separate between the two bundles 102. The forced hot air tunnel 130 causes the bag of polymeric film material to shrink about the bundle of workpieces and also effects the sealing of the bag's longitudinal seam.

Figure 2:
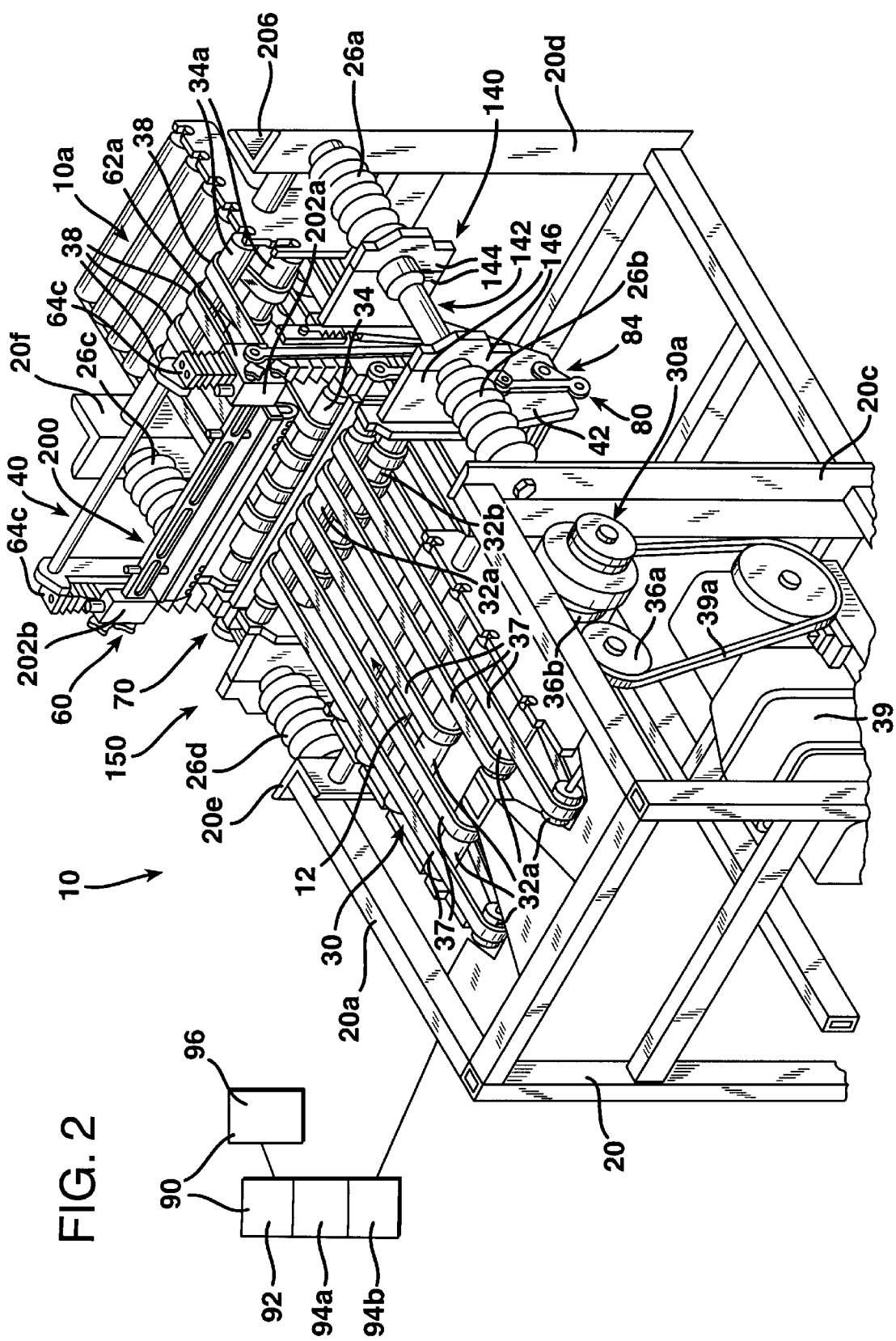
FIG. 2 is a perspective view of the heat seal apparatus of the present invention.
Figure 3:
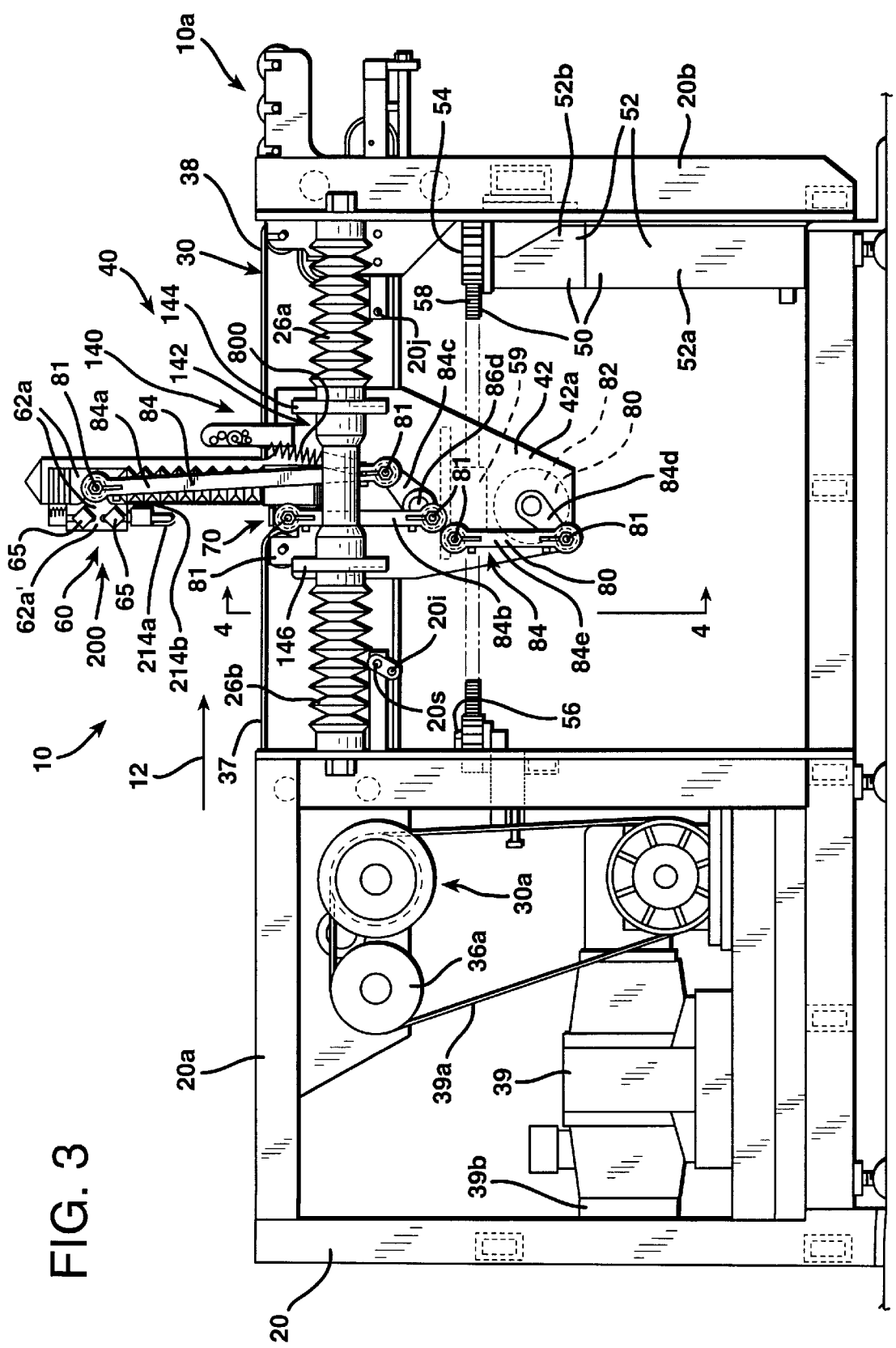
FIG. 3 is a side view of the apparatus illustrated in FIG. 2.

Referring now to FIGS. 2 and 3, the heat seal apparatus 10 of the present invention includes a support frame 20 and a conveyor system 30 associated with the support frame 20 for receiving the plurality of spaced-apart bundles 102 of one or more workpieces and moving the bundles 102 along a first path 12 extending from a first portion 20a of the support frame 20 to a second portion 20b of the support frame 20. The spaced-apart bundles 102 are wrapped in polymeric film material 105 as they move along the first path 12 such that sections of the film material 105 extend between adjacent, spaced-apart bundles 102. The apparatus 10 further includes a heat seal device 40 for effecting a heat seal in the polymeric film material 105 located between the adjacent bundles 102.

As can be seen from FIGS. 2 and 3, the heat seal device 40 includes a carriage 42, first servo-drive apparatus 50 for effecting horizontal movement of the carriage 42 back and forth along a portion of the first path 12, a first seal bar assembly 60 mounted on the carriage 42 for vertical movement toward and away from the first path 12, a second seal bar assembly 70 mounted on the carriage 42 for vertical movement toward and away from the first path 12 and the first seal bar assembly 60, second servo-drive apparatus 80 for effecting movement of the first and second seal bar assemblies 60 and 70 toward and away from the first path 12, and processor apparatus 90 for controlling the operation of the first and second servo-drive apparatuses 50 and 80.

Figure 4:
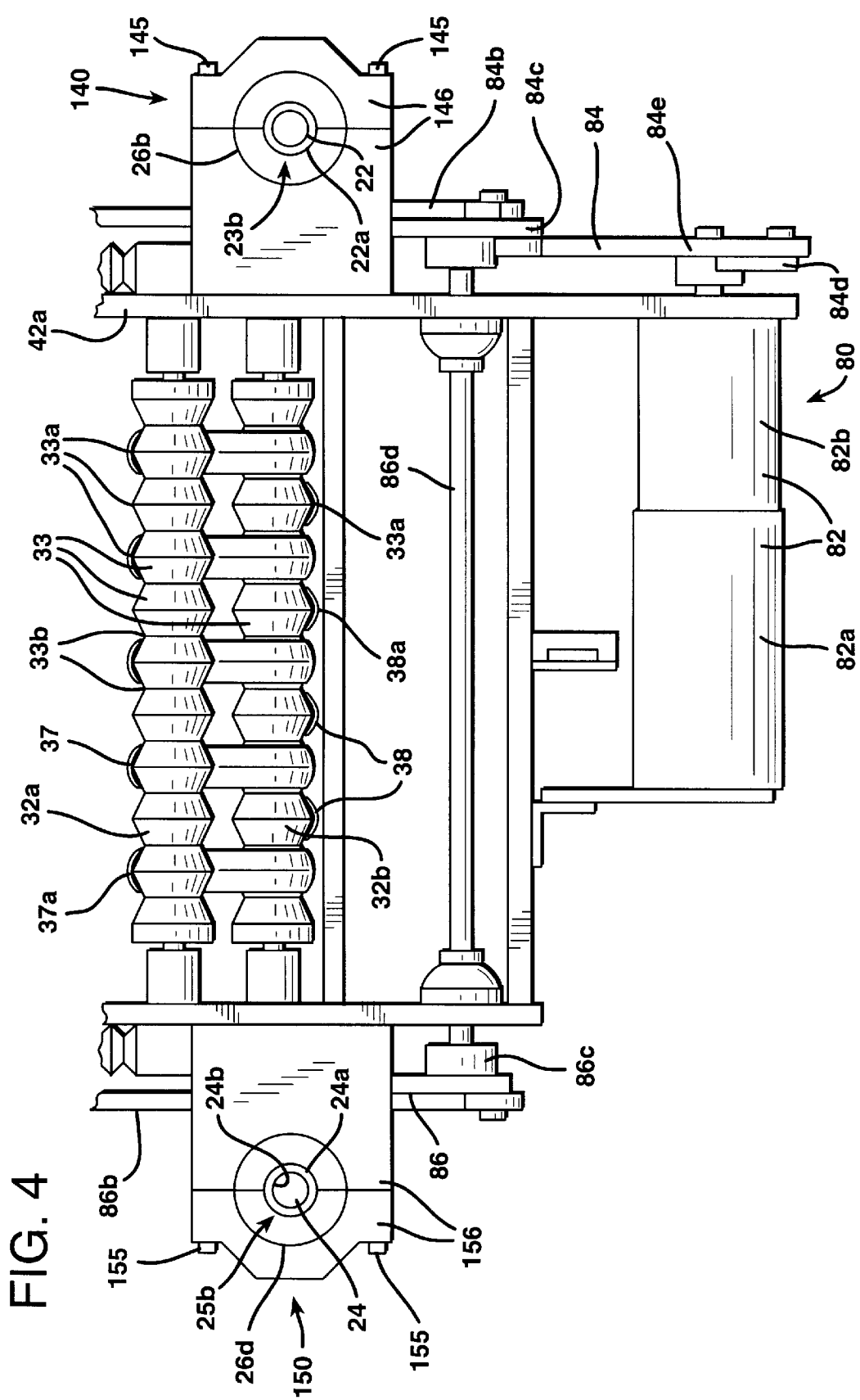
FIG. 4 is a view taken along view line 4—4 in FIG. 3.

The second servo-drive apparatus 80 comprises a second servomotor device 82, which includes a conventional servomotor 82a and an associated gear reducer 82b, see FIG. 4. The second servo-drive apparatus 80 further comprises first and second linkage assemblies 84 and 86 which are coupled to the second servomotor device 82 and the first and second seal bar assemblies 60 and 70 for transferring motion from the servomotor device 82 to the first and second seal bar assemblies 60 and 70 to effecting vertical movement of the first and second seal bar assemblies 60 and 70 toward and away from the first path 12 and one another. The first and second seal bar assemblies 60 and 70 are caused to come together by the second servo-drive apparatus 80 to clamp and effect a heat seal in polymeric film material 105 extending between them.

Figure 10A:
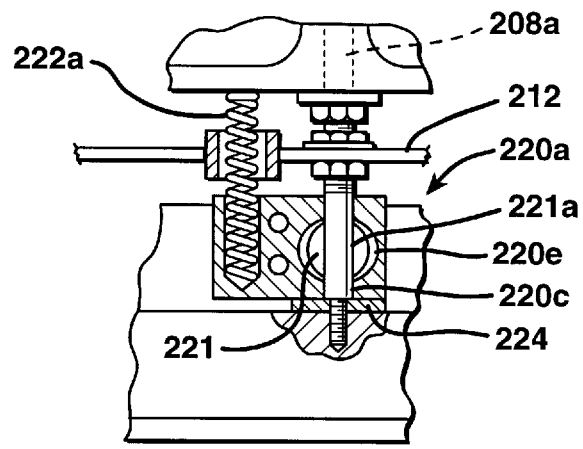
FIG. 10A is a view of a first shield connecting block.

The first linkage assembly 84 comprises first and second connecting rods 84a and 84b which are coupled respectively to the first and second seal bar assemblies 60 and 70 and to a first crank arm 84c via conventional aircraft bearings 81, see FIGS. 3 and 10. A second crank arm 84d is coupled to the second servomotor device 82. A third connecting rod 84e is coupled to the first and second crank arms 84c and 84d via conventional aircraft bearings 81. The aircraft bearings 81 allow for enhanced self-alignment of the elements to which they are coupled and are commercially available from MB Manufacturing Industries, Valparaiso, Ind. under the product designation 6NBK919YZP. A counterbalance spring 800 extends from the frame 20 to the crank arm 84c.

The second linkage assembly 86 comprises fourth and fifth connecting rods 86a and 86b, see FIG. 10, which are coupled respectively to the first and second seal bar assemblies 60 and 70 and to a third crank arm 86c via aircraft bearings 81, see also FIG. 4. A transfer shaft 86d is coupled to and extends between the first and third crank arms 84c and 86c to transfer motion from the first crank arm 84c to the third crank arm 86c.

Figure 12:
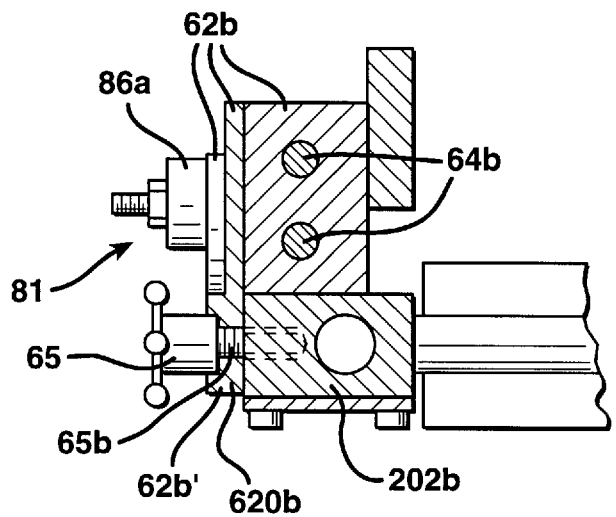
FIG. 12 is a view taken along view line 12—12 in FIG. 11.
Figure 11:
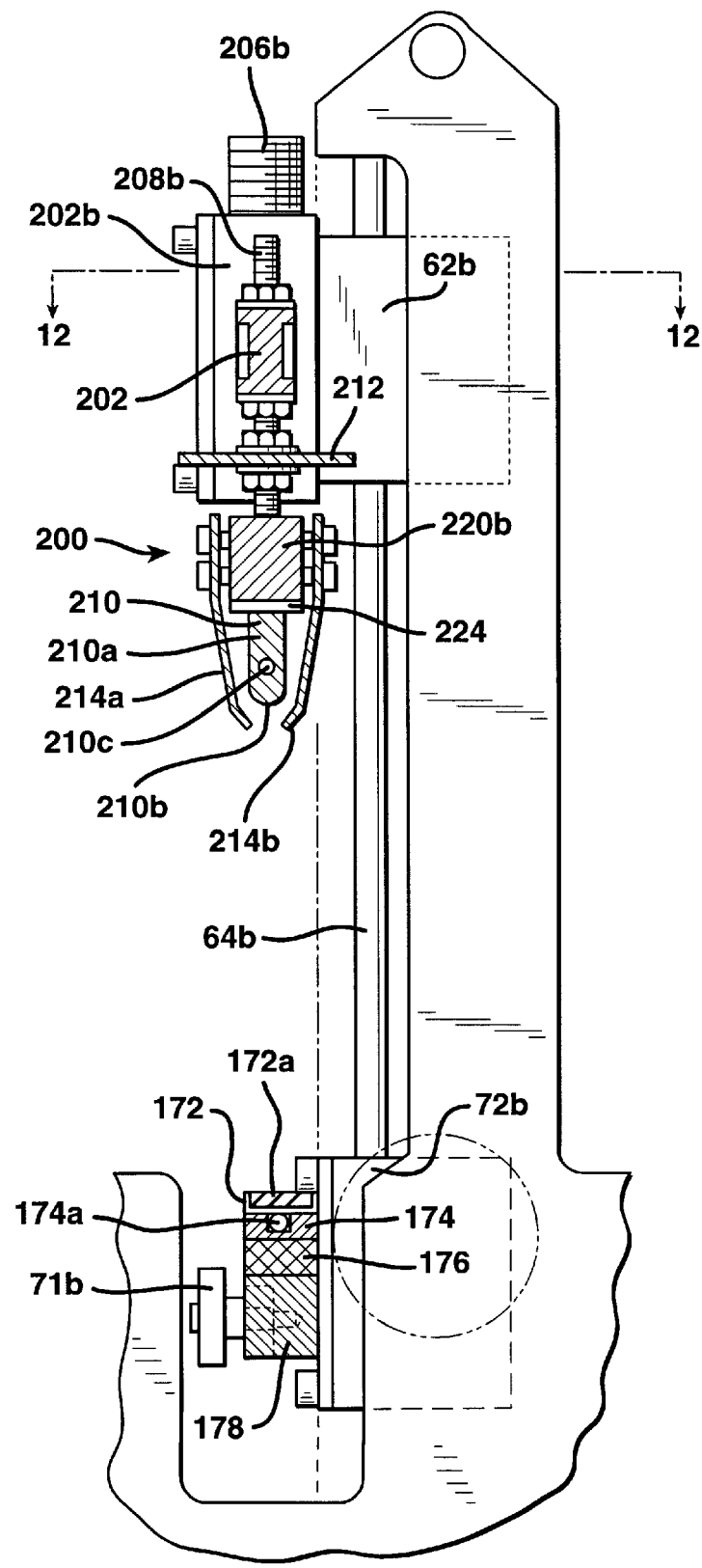
FIG. 11 is a view taken along view line 11—11 in FIG. 10.

The first seal bar assembly 60 comprises first and second upper mounting elements 62a and 62b which are coupled to the first and fourth connecting rods 84a and 86a via aircraft bearings 81, see FIGS. 3, 11 and 12. The first and second upper mounting elements 62a and 62b comprise conventional linear bearings which are slidably received respectively on first and second sets of vertical guide shafts 64a and 64b, see FIGS. 5 and 10–12. The guide shafts 64a and 64b have associated upper end plates 64c and lower end plates 64d which are fixedly coupled to the support frame 20. The first seal bar assembly 60 further includes a top seal bar assembly 200 which is releasably coupled to the first and second upper mounting elements 62a and 62b via threaded securement members 65 having turn knobs 65a, see FIGS. 10 and 12.

Figure 12A:
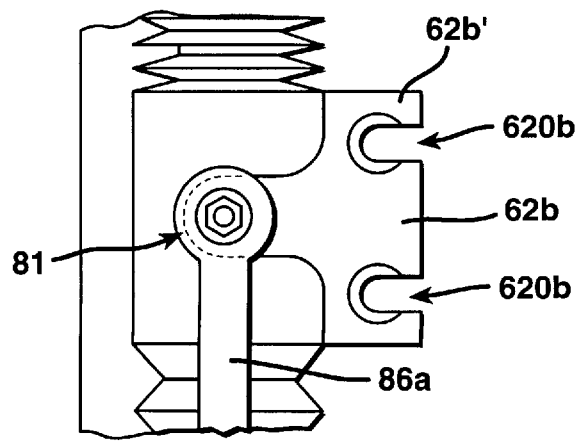
FIG. 12A is a side view of a mounting element.

The top seal bar assembly 200 comprises first and second upper mounting brackets 202a and 202b which have threaded bores for receiving the threaded securement members 65, see FIGS. 10 and 12. The first and second upper mounting elements 62a and 62b include end portions 62a' and 62b' having first and second sets of open slots 620a and 620b which are adapted to receive the threaded portions 65b of the securement members 65, see FIG. 12A. Thus, the top seal bar assembly may be releasably secured to the first and second upper mounting elements 62a and 62b by placing the securement member threaded portions 65b in the slots 620a and 620b in the mounting elements 62a and 62b and advancing the securement members 65 into the threaded bores in the mounting brackets 202a and 202b until the end portions 62a' and 62b' of the mounting elements 62a and 62b are tightly clamped between the turn knobs 65a of the securement members 65 and outer faces of the mounting brackets 202a and 202b. Hence, the top seal bar assembly 200 may be easily removed from the apparatus 10 for repair or replacement by merely loosening the securement members 65 via turn knobs 65a and removing the seal bar assembly 200 from the mounting elements 62a and 62b.

The top seal bar assembly 200 includes an upper cross beam 202 which is received in first and second oversized recesses 204a and 204b provided in the first and second upper mounting brackets 202a and 202b, see FIG. 10. First and second spring biasing elements 206a and 206b are threadedly received in bores in the first and second upper mounting brackets 202a and 202b. Each of the spring biasing elements 206a and 206b includes a spring-biased pin 206c which extends out from a threaded casing 206d for engaging the cross beam 202 and urging the cross beam 202 downwardly within the first and second recesses 204a and 204b. The spring biasing elements 206a and 206b allow the cross beam 202 to deflect upwardly during heat sealing at one or both of its ends approximately 0.5 inch.

The top seal bar assembly 200 also includes first and second studs 208a and 208b which are fixedly coupled to the cross beam 202; an upper heat seal bar 210 which is fixedly coupled to the studs 208a and 208b; a heat shield 212 comprising a generally horizontal plate fixedly connected to the studs 208a and 208b and interposed between the heat seal bar 210 and the beam 202; generally vertically positioned first and second protective heat seal bar shields 214a and 214b; first and second bar shield connecting blocks 220a and 220b which are fixedly connected to the first and second heat seal bar shields 214a and 214b and are slidably moveable along the studs 208a and 208b; and first and second biasing elements 222a and 222b which extend through collars 212a in the heat shield 212 and engage respectively the first and second blocks 220a and 220b and the cross beam 202 for urging the first and second blocks 220a and 220b along with the first and second heat seal bar shields 214a and 214b in a direction away from the cross beam 202, see FIGS. 10 and 11. Hence, the downward biased bar shields 214a and 214b extend down below a lower blunt edge 210b of the heat seal bar 210 until they engage and are moved upwardly by the second seal bar assembly 70. The heat seal bar 210 comprises an iron bar 210a having a lower edge defining the generally blunt edge 210b. A heating element 210c is embedded in the iron bar 210a and extends generally along its entire extent, see FIGS. 10 and 11.

As noted above, the spring biasing elements 206a and 206b allow the cross beam 202 to deflect upwardly during heat sealing at one or both of its ends approximately 0.5 inch. Because the heat seal bar 210 is fixedly connected to the cross beam 202 via the studs 208a and 208b, the spring biasing elements 206a and 206b allow the heat seal bar 210 to deflect upwardly at one or both of its end if, during heat sealing, the uppermost surface of the second seal bar assembly 70 against which the heat seal bar 210 engages is not substantially parallel to the heat seal bar 210.

The first and second shield connecting blocks 220a and 220b have first and second vertical bores 220c and 220d and first and second horizontal bores 220e and 220f extending through them. The first and second horizontal bores 220e and 220f receive respectively first and second cylindrical brass stock members 221 and 223, see FIGS. 10 and 10A. The stock members 221 and 223 have bores 221a and 223a extending completely through them. The studs 208a and 208b slidably extend through the bores 221a and 223a in the stock members 221 and 223 and through the bores 220c and 220d in the connecting blocks 220a and 220b. The stock members 221 and 223 are able to rotate within the bores 220e and 220f in the connecting blocks 220a and 220b. The vertical bores 220c and 220d in the connecting blocks 220a and 220b are slightly oversized such that the blocks 220a and 220b can move vertically up and down along the studs 208a and 208b and pivot somewhat on the studs 208a and 208b. In the illustrated embodiment, the horizontal bore 220e is slotted such that it has an elliptical shape to allow for some side-to-side movement of the brass stock member 221 within the block 220a. Such movement reduces the likelihood that the first and second blocks 220a and 220b will become jammed on the studs 208a and 208b when the heat seal bar shields 214a and 214b move vertically in an uneven manner.

Polymeric washers 224 are interposed between the first and second blocks 220a and 220b and the heat seal bar 210 to reduce heat transfer from the seal bar 210 to the first and second blocks 220a and 220b, which blocks are formed from a metal such as aluminum, see FIGS. 10 and 11.

Figure 13:
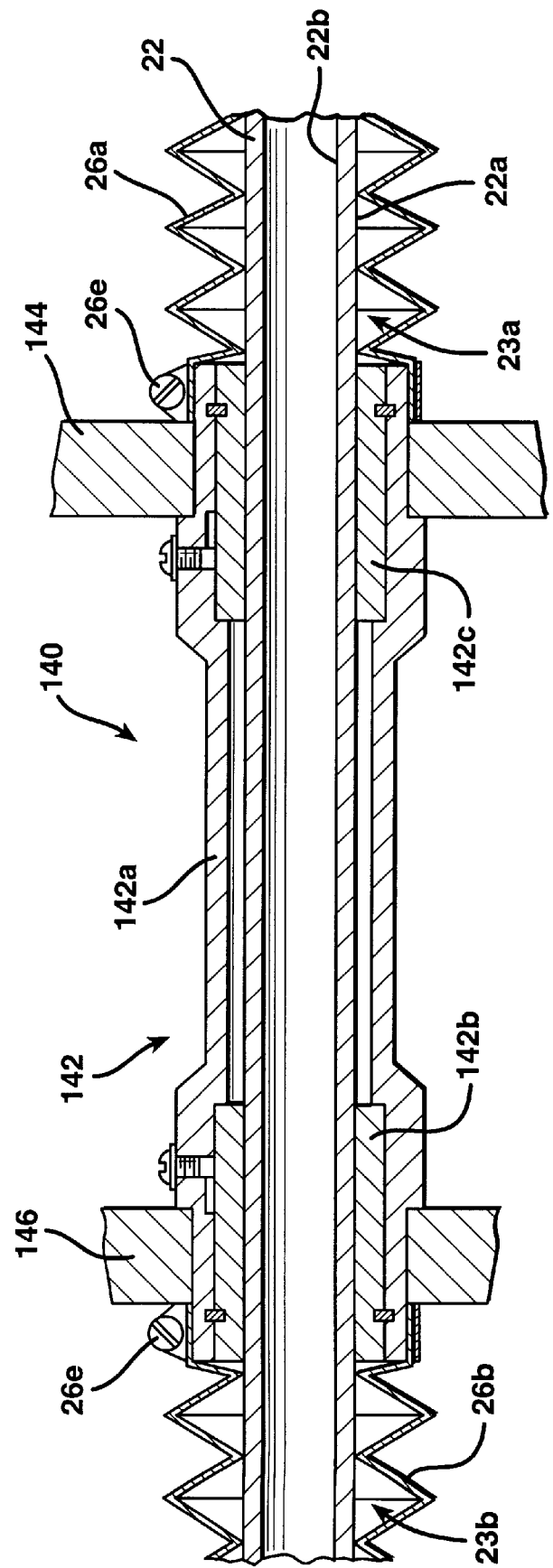
FIG. 13 is a view taken along view line 13—13 in FIG. 5.

The support frame 20, in the illustrated embodiment, comprises first, second, third and fourth vertical support members 20c–20f, a first horizontal guide shaft 22 extending between the first and second vertical support members 20c and 20d and a second horizontal guide shaft 24 extending between the third and fourth vertical support members 20e and 20f, see FIGS. 2, 4 and 13.

Figure 5:
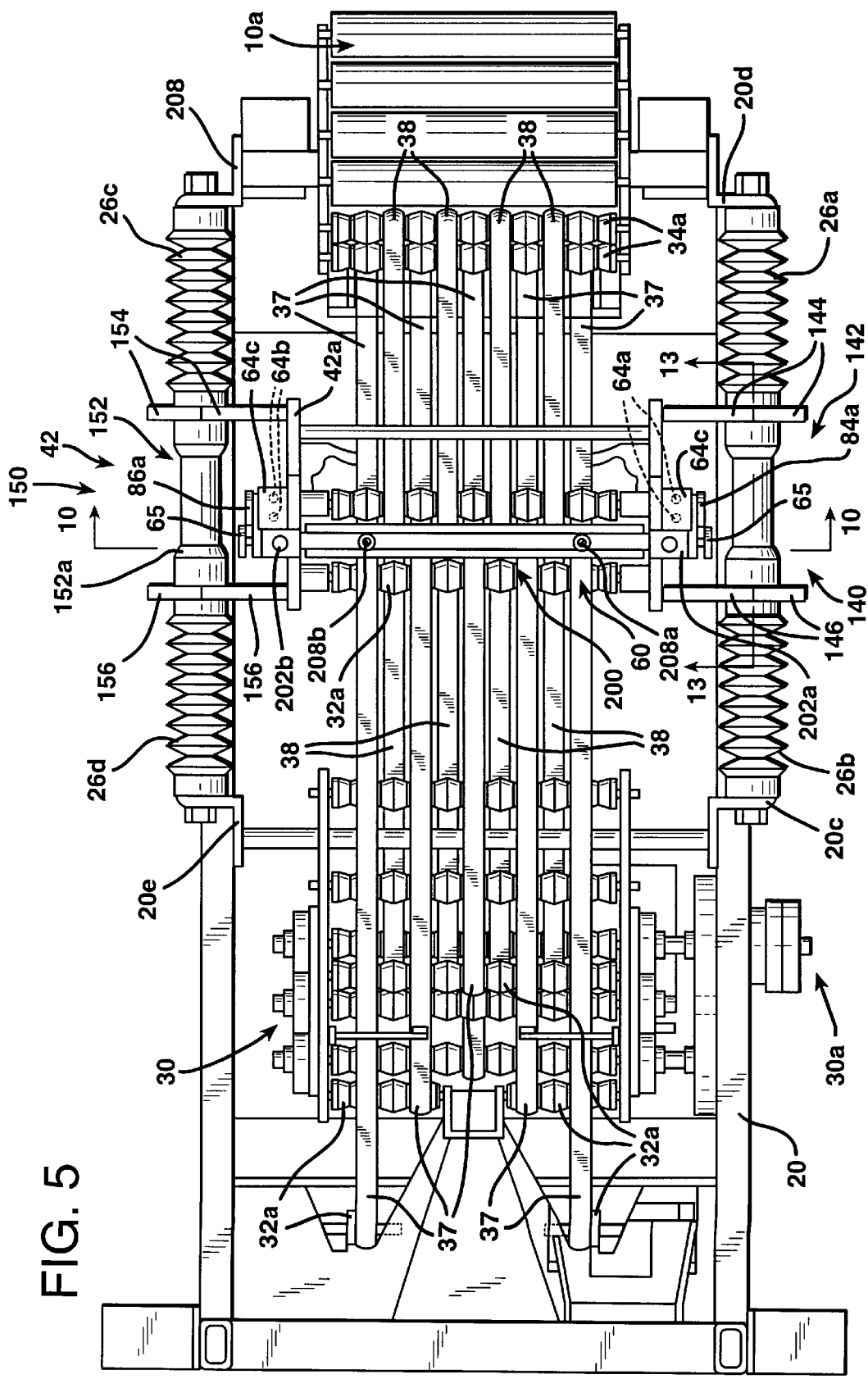
FIG. 5 is a top view of the apparatus illustrated in FIG. 2.

The carriage 42 comprises a carriage frame 42a, the guide shafts 64a and 64b and their associated upper end plates 64c and lower end plates 64d, and first and second horizontal linear bearing assemblies 140 and 150, see FIG. 5. The first horizontal bearing assembly 140 includes a first tubular bearing section 142 which is received on the first horizontal guide shaft 22 and first and second sets of support plates 144 and 146 which are fixedly coupled to the carriage frame 42a and releasably secured to the first tubular bearing section 142 via conventional fasteners such as bolts 145, see FIGS. 4 and 13. The first tubular bearing section 142 comprises a metal tubular portion 142a having first and second linear bearings 142b and 142c fixedly coupled at its opposite ends which engage the guide shaft 22.

The second bearing assembly 150 is constructed in essentially the same manner as the first bearing assembly 140 and includes a second tubular bearing section 152 which is received on the second horizontal guide shaft 24 and third and fourth sets of support plates 154 and 156 which are fixedly coupled to the carriage frame 42a and are releasably secured to the second tubular bearing section 152 by conventional fasteners 155, see FIGS. 4 and 5. The second tubular bearing section 152 comprises a metal tubular portion 152a having first and second linear bearings (not shown) at its opposite ends which engage the guide shaft 24.

The support frame 20 further includes four sets of bellows 26a–26d which are fitted over the first and second horizontal guide shafts 22 and 24 and coupled to the first and second linear bearing assemblies 140 and 150 and the first, second, third and fourth vertical support members 20c–20f via conventional clamps 26e, see FIG. 5 and 13. The bellows 26a–26d keep dust and other contaminates from reaching the shafts 22 and 24 and the bearings forming part of the first and second tubular bearing sections 142 and 152.

The shafts 22 and 24 are hollow, see FIGS. 4 and 13. One or more openings (not shown) are provided at both ends of each of the shafts 22 and 24 adjacent to the vertical support members 20c–20f. The openings extend from the upper surfaces 22a and 24a of the shafts 22 and 24 to the bores 22b and 24b extending through the shafts 22 and 24. As the first linear bearing assembly 140 moves along the shaft 22, the openings in the shaft 22 provide a path for air to travel from a first air reservoir 23a defined by the bellows 26a and the upper surface 22a of the shaft 22 through the bore 22b to a second air reservoir 23b defined by the bellows 26b and the upper surface 22a of the shaft 22 and vice versa. Similarly, as the second linear bearing assembly 150 moves along the shaft 24, the openings in the shaft 24 provide a path for air to travel from a third air reservoir (not shown) defined by the bellows 26c and the upper surface 24a of the shaft 24 through the bore 24b to a second air reservoir 23b defined by the bellows 26d and the upper surface 24a of the shaft 24 and vice versa.

The first servo-drive apparatus 50 comprises a first servomotor device 52 including a servomotor 52a and an associated gear reducer 52b, see FIG. 3. A first sprocket 54 is coupled to the output shaft of the first servomotor 52a. A second sprocket 56 is rotatably supported by the frame 20 and is spaced from the first sprocket 54. A drive belt 58 extends about the first and second sprockets 54 and 56. A clamping device 59 is fixedly coupled to the carriage frame 42a and the drive belt 58 to effect movement of the carriage frame 42a as the servomotor 52a rotates, see also FIG. 6.

The second seal bar assembly 70 comprises first and second anvil bearing plates 72a and 72b, first and second anvil brackets 74a and 74b which are fixedly coupled respectively to the first and second anvil bearing plates 72a and 72b, and a lower anvil 170 which is releasably coupled to the first and second anvil brackets 74a and 74b. The first and second anvil bearing plates 72a and 72b comprise conventional linear bearings which are slidably received respectively on the first and second sets of vertical guide shafts 64a and 64b, see FIGS. 10 and 11. The first and second anvil brackets 74a and 74b are coupled respectively to the second and fifth connecting rods 84b and 86b via aircraft bearings 81, see FIG. 10. Movement of the connecting rods 84b and 86b via the second servomotor device 82 effects vertical movement of the second seal bar assembly 70 toward and away from the first path 12.

The lower anvil 170 includes an aluminum channel member 172 having a resilient polymeric layer 172a located therein, see FIGS. 10 and 11. The resilient layer 172a is a commercially available high-temperature silicone sheet. Preferably, the silicone sheet has a durometer "A" scale hardness of about 50 to about 60. An intermediate plate 174 is positioned below the channel member 172 and has a heating element 174a extending along its longitudinal length. A thermal insulation layer 176 is positioned below the intermediate plate 174, and a lower aluminum beam member 178 is positioned below the insulation layer 176. The insulation layer 176 prevents heat from being transferred to the first and second anvil bearing plates 72a and 72b from the intermediate plate 174 and is commercially available from Glastic Corp., 4321 Glenridge Rd., Cleveland, Ohio under the product designation Glasstherm HT550.

First and second threaded connectors 71a and 71b having gripping knobs 71a' and 71b' extend through the first and second anvil brackets 74a and 74b and are threadedly received by the beam member 178 for releasably connecting the anvil 170 to the first and second anvil brackets 74a and 74b, see FIGS. 10 and 11. Hence, the anvil 170 can be easily removed for repair or replacement by threadedly removing the connectors 71a and 71b from the beam member 178.

The conveyor system 30 comprises a plurality of first idler rollers 32a and 32b located on the support frame 20 and the carriage frame 42a; a plurality of second idler rollers 34a and 34b located on the support frame 20 and the carriage frame 42a; first and second drive rollers 36a and 36b rotatably supported on the support frame 20; infeed belts 37 which extend about the first idler rollers 32a and 32b and the first drive roller 36a, and engage second idler roller 34b; outfeed belts 38 which extend about the second idler rollers 34a and 34b and the second drive roller 36b, and engage the first idler roller 32b; and a drive motor 39 for effecting rotation of the first and second drive rollers 36a and 36b via drive belt 39a, see FIGS. 3 and 6–9. Hence, rotation of the drive motor 39 effects movement of the belts 37 and 38.

The infeed belts 37 deliver the bundles 102 to the heat seal device 40. The outfeed belts 38 receive the bundles 102 after they have passed through the heat seal device 40 and convey the bundles 102 to an exit portion 10a of the apparatus where they are received by the tunnel conveyor 132.

The idler rollers 32a, 32b, 34a and 34b have crowned outer surface sections 33, i.e., the rollers 32a, 32b, 34a and 34b have one or more sections 33 with a central surface portion 33a having a first outer diameter and outer edge surface portions 33b each having a second diameter which is less than the first diameter, see FIG. 4. The belts 37 and 38 are seated on the rollers 32a, 32b, 34a and 34b such that the center portion 37a and 38a of each of the belts 37 and 38 is received on a central portion 33a of its associated roller.

The conveyor system 30 further includes a clutch mechanism 30a coupled to the second drive roller 36b for causing the second drive roller 36b to dwell for a predetermined period of time to allow slack to occur within the section of the polymeric material 105 about to be heat sealed such that heat sealing of that section can take place without causing stretching or damage to the section.

The drive motor 39 has a tachometer 39b associated with it which generates signals received by the processor apparatus 90 indicating the rotational speed of the motor 39, see FIG. 3.

The support frame includes a plurality of first and second belt adjustment mechanisms 300a and 300b for varying the tension in the belts 37 and 38, see FIGS. 6–9. One first belt adjustment mechanism 300a is provided for each infeed belt 37 and one second belt adjustment mechanism 300b is provided for each outfeed belt 38. In order to reduce the amount of space that the belt adjustment mechanisms 300a and 300b require within the apparatus 10, the mechanisms 300a and 300b are staggered and alternatively positioned relative to one another such that each first mechanism 300a has one or two second mechanisms 300b adjacent to it and vice versa.

Each first adjustment mechanism 300a comprises an idler roller 302a rotatably supported by a single carriage 304a. One of the infeed belts 37 extends about the roller 302a, see FIGS. 7–9. A bolt 306a is threadedly coupled to a static frame extension 20g and the carriage 304a such that rotation of the bolt 306a effects back and forth movement of the carriage 304a and the idler roller 302a. Hence, the tension within the belt 37 extending about the idler roller 302a can be varied.

Figure 6:
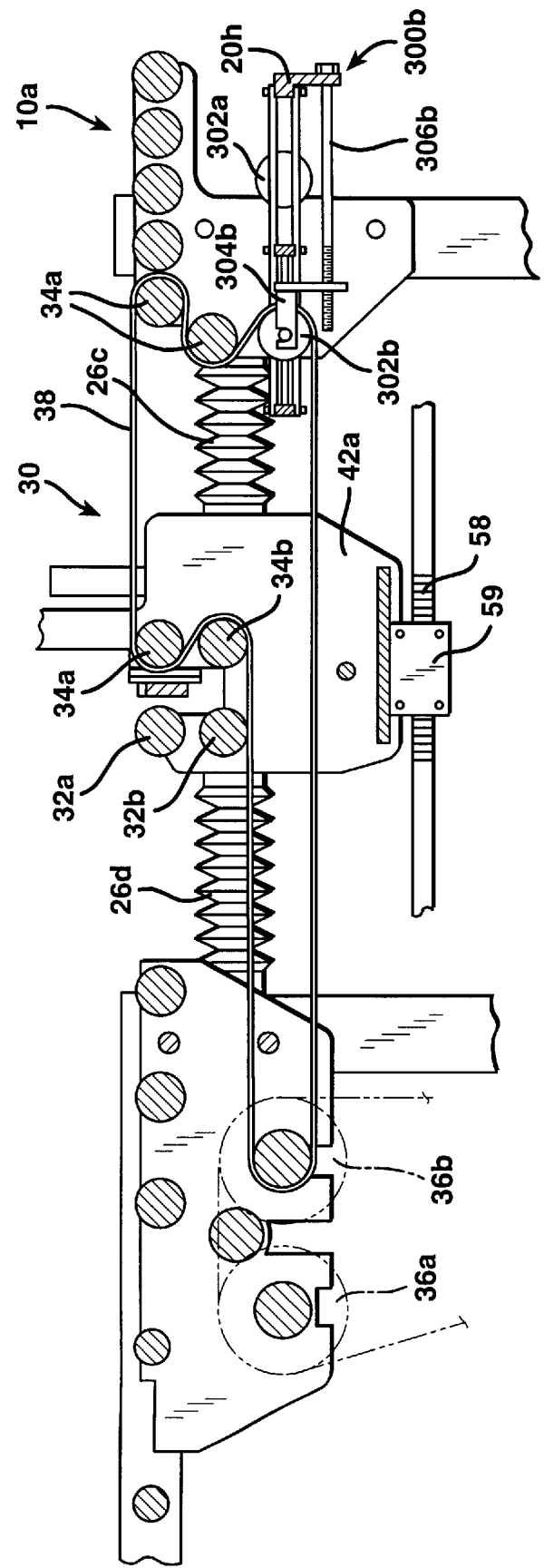
FIG. 6 is a side view partially in section and with infeed belts removed showing an outfeed belt.
Figure 7:
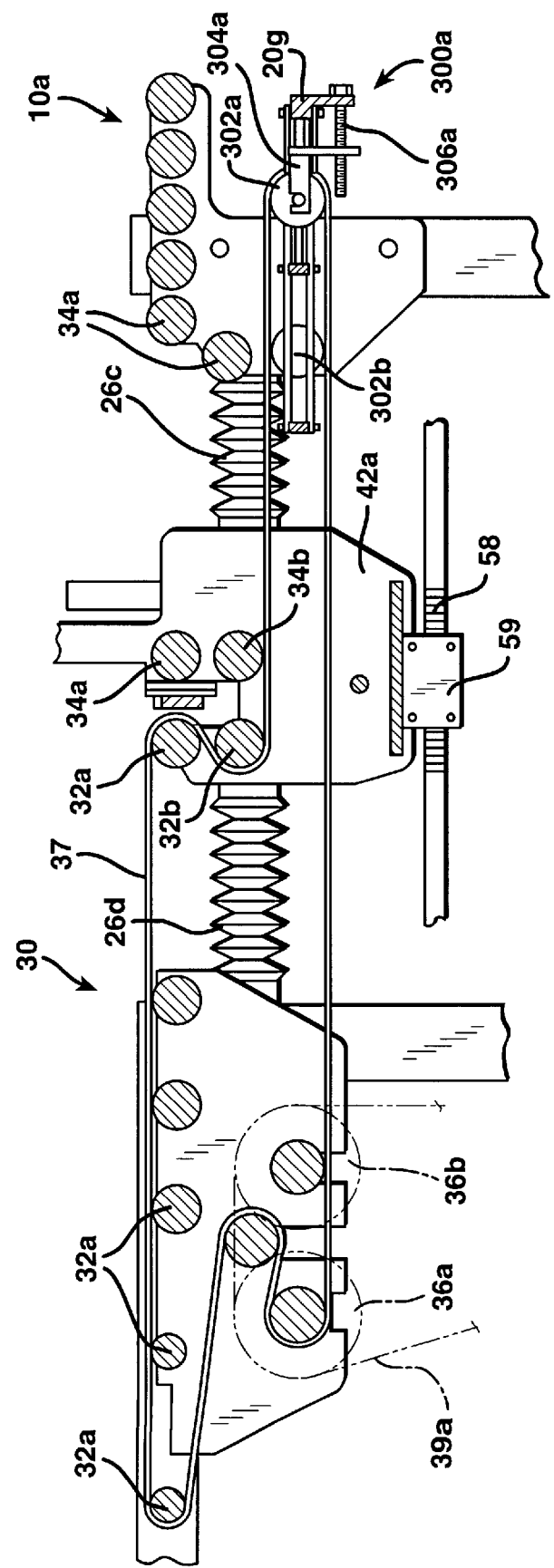
FIGS. 7–9 are side views partially in section and with outfeed belts removed showing first, second and third infeed belts.
Figure 8:
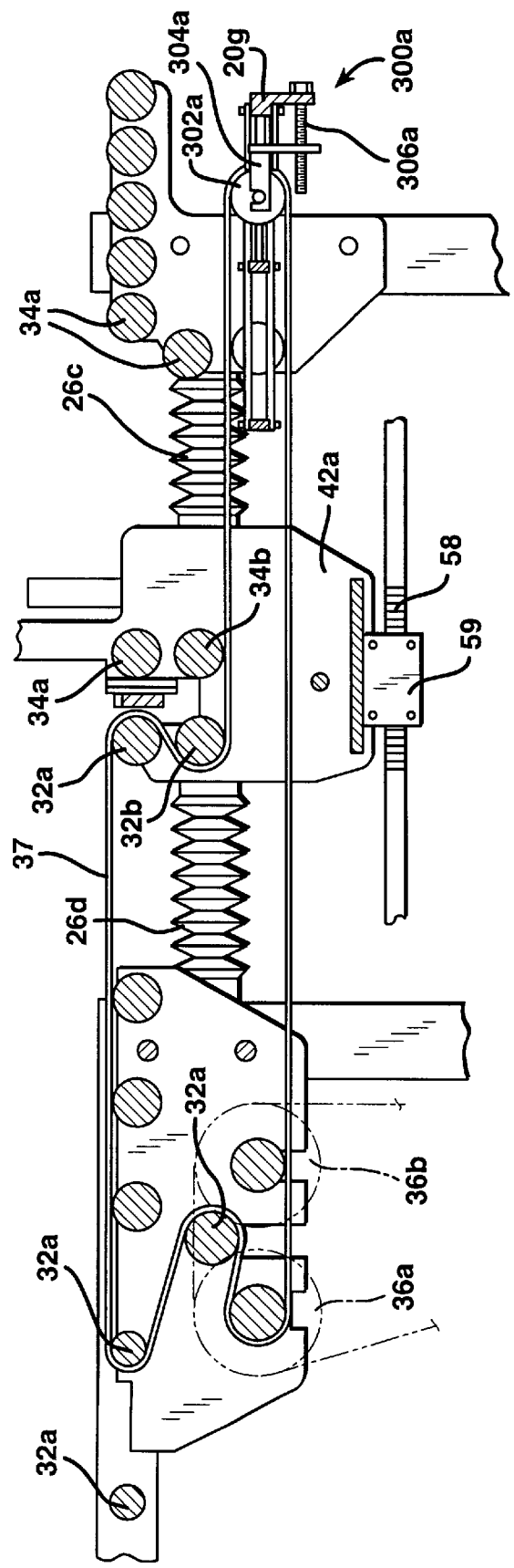
Figure 9:
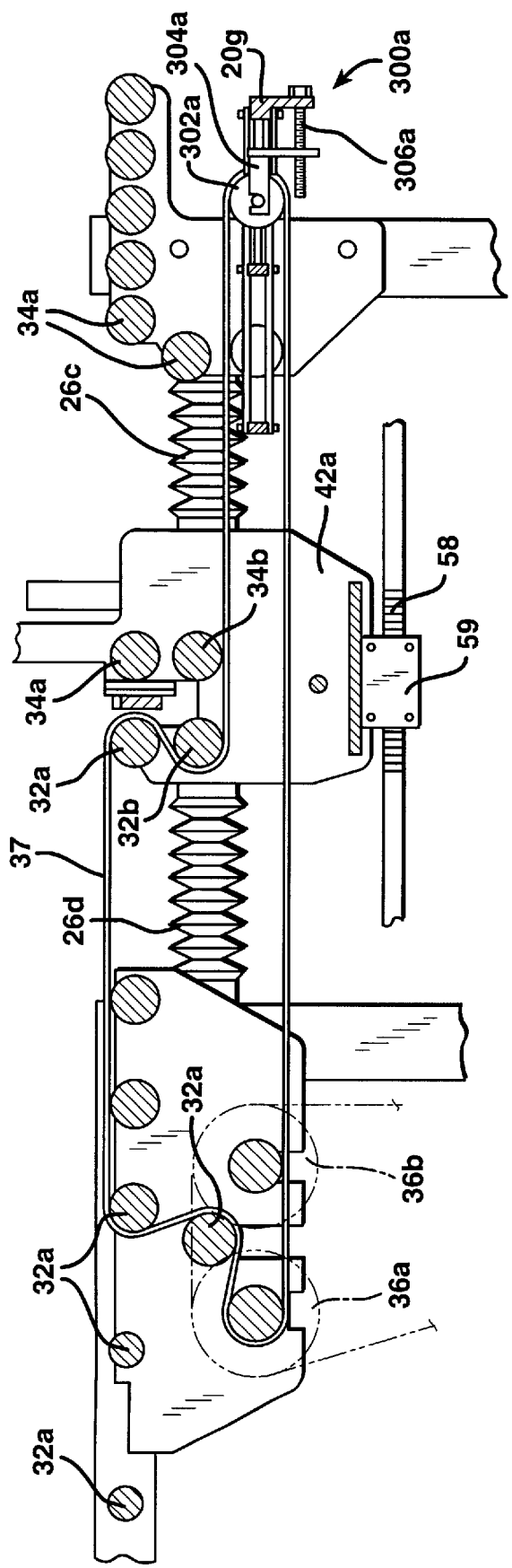

Each second adjustment mechanism 300b comprises an idler roller 302b rotatably supported by a single carriage 304b, see FIG. 6. One of the outfeed belts 38 extends about the roller 302b. A bolt 306b is threadedly received by a static frame extension 20h and passes through the carriage 304b such that rotation of the bolt 306b effects back and forth movement of the carriage 304b and the idler roller 302b. Hence, the tension within the belt 38 extending about the idler roller 302b can be varied. The bolts 306b are longer than the bolts 306a due to the staggered relationship of the first and second adjustment mechanisms 300a and 300b, see FIGS. 6 and 7.

The processor apparatus 90 comprises a motion controller 92 which is commercially available from Allen-Bradley as Model 4100-214-R, first and second servo-controllers 94a and 94b which are commercially available from Allen-Bradley under the product designation 1391 Digital AC Servo Drive, and a conventional system controller 96, see FIG. 2. The motion controller 92 sends control signals to the first and second servo-controllers 94a and 94b which, in turn, control power to the servomotors 52a and 82a. The system controller 96 communicates with the motion controller 92 and controls the speed of the drive motor 39 such that the timing of the heat seal apparatus 10 is consistent with the timing of the other devices associated with or forming part of the packaging line 100. The system controller 96 controls the operation of the clutch mechanism 30a.

The support frame 20 supports first and second carriage overtravel proximity sensors 20i and 20j, see FIG. 3.

The sensors 20i and 20j generate an overtravel signal when the carriage 42 travels beyond one of two predefined end points along the first path 12. The overtravel signals generated by the sensors 20i and 20j are received by the motion controller 92. Upon receiving an overtravel signal from one of the two sensors 20i and 20j, the motion controller 92 sends a stop signal to the first servo-controller 94a which, in turn, stops movement of the first servomotor device 52 and, hence, the carriage 42.

The support frame 20 also supports a seal bar assembly overtravel proximity sensor 20k, see FIG. 10. The sensor 20k generates an overtravel signal when the first seal bar assembly 60 travels beyond a predefined point along the vertical guide shafts 64a and 64b. The signals generated by the sensor 20k are received by the motion controller 92. Upon receiving an overtravel signal from the overtravel sensor 20k, the motion controller sends a stop signal to the second servo-controller 94b which, in turn, stops movement of the second servomotor device 82 and, hence, the first seal bar assembly 60.

The frame 20 further supports a proximity home position sensor 201, see FIG. 10. The sensor 201 generates a signal when a flag 20m, mounted on the beam 202, moves past the sensor 201. The signal from the home position sensor 201 is received by the motion controller 92. Before initiating a heat sealing cycle, the motion controller 92 effects movement of the second servomotor device 82 via the second servo-controller 94b until the flag 20m triggers the sensor 201.

An additional proximity home position sensor 20s is supported on the frame 20, see FIG. 3. The sensor 20s generates a signal when the carriage frame 42a moves past it. The signal from the home position sensor 20s is received by the motion controller 92. Before initiating a heat sealing cycle, the motion controller 92 effects movement of the first servomotor 52 via the first servo-controller 94a until the carriage frame 42a triggers the sensor 20s.

The heat seal apparatus 10 further includes first and second shield proximity sensors 400 and 402 mounted on the cross beam 202, see FIG. 10. Flags 400a and 402a are fixedly mounted to opposing ends of the heat seal bar shield 214b. Alternatively, the flags 400a and 402a could be mounted to the heat seal bar shield 214a. When the heat seal bar shield 214b is deflected upwardly, one or both of the sensors 400 and 402 generates a safety stop signal in response to sensing upward movement of one or both of the flags 400a and 402a. The signal or signals from the sensors 400 and 402 are received by the motion controller 92. A disable sensor 20n is mounted on the support frame 20 and generates a signal to the motion controller 92 in response to sensing flag 20m during downward movement of the top seal bar assembly 200. The signal from the sensor 20n indicates to the motion controller 92 that the shields 214a and 214b have moved within a predefined distance of the anvil 170, e.g., 0.375 inch. If the motion controller 92 receives a stop signal from one of shield sensors 400 and 402 before it receives a disable signal from the sensor 20n, the motion controller 92 will send a stop signal to the second servo-controller 94b which, in turn, will stop movement of the second servomotor device 82 and, hence, the top seal bar assembly 200. This is a safety control feature to prevent harm to an operator should an operator mistakenly position his hand between the top assembly 200 and the anvil 170. If, however, the motion controller 92 receives a disable signal from the sensor 20n before it receives a stop signal from one or both of the shield sensors 400 and 402, the motion controller 92 will ignore the stop signal and let the second servomotor device 82 continue its downward movement of the top seal bar assembly 200.

A photocell 500 is provided which detects the incoming edge of each bundle 102 of workpieces, see FIG. 1. The signals generated by the photocell 500 are used by the motion controller 92 to control the initiate of each heat sealing cycle.

The motion controller 92 communicates with the system controller 96 and receives signals from the sensors 20*i*, 20*j*, 20*k*, 20*l*, 20*n*, 20*s*, 400, 402, the tachometer 39*b*, the photocell 500 and position encoders forming part of the first and second servomotors 52*a* and 82*a* and generates its control signals to the first and second servo-controllers 94*a* and 94*b* based upon those inputs so as to control the movement of the seal bar 210 and the anvil 170 in a desired manner. Preferred paths of movement for the seal bar 210 and the anvil 170 are sinusoidal paths or paths having sinusoidal portions.

The heat seal apparatus 10, because it comprises first and second servomotor devices 52 and 82, is very versatile and, as such, permits the horizontal movement of the heat seal carriage 42 and the vertical movement of the first and second seal bar assemblies 60 and 70 toward and away from the first path 12 to be easily and independently controlled and varied relative to one another. As a result, the paths along which the seal bar 210 and the lower anvil 170 travel relative to the frame 20 can be easily changed. Thus, the present invention allows the paths through which the seal bar 210 and the lower anvil 170 travel to be changed electronically rather than through the removal of a first set of mechanical elements and the subsequent substitution of different set of mechanical elements. The heat seal apparatus 10 is also advantageous in that it is capable of improved throughput speeds, e.g., 45 cycles per minute.

Protective bellows 600 encase the vertical guide shafts 64*a* and 64*b* and are positioned between the upper end plates 64*c*, the mounting elements 62*a* and 62*b*, the first and second anvil bearing plates 72*a* and 72*b*, and the lower end plates 64*d*.

Having described the invention in detail and by reference to a preferred embodiment thereof, it will be apparent that modifications and variations are possible without departing from the scope of the invention defined in the appended claims. For example, it is contemplated that the first and second seal bar assemblies may move toward and away from the first path at an angle other than 90°, e.g., at an angle of 45°.

It is further contemplated that the first and second linkage assemblies 84 and 86 of the second servo-drive apparatus 80 may be replaced by first and second belts, cables or chains (not shown) which are coupled to the second servomotor device 82 and to one or both of the first and second seal bar assemblies 60 and 70 for effecting vertical movement of the seal bar assemblies 60 and 70 toward and away from one another. If the belts, cables or chains are coupled to only one of the seal bar assemblies 60 and 70, the other seal bar assembly is fixed in position. It is additionally contemplated that the first and second linkage assemblies 84 and 86 of the second servo-drive apparatus 80 may be replaced by first and second cam mechanisms (not shown) which are coupled to the second servomotor device 82 and to one or both of the first and second seal bar assemblies 60 and 70 for effecting vertical movement of the seal bar assemblies 60 and 70 toward and away from one another. If the cam mechanisms are coupled to only one of the seal bar assemblies 60 and 70, the other seal bar assembly is fixed in position. It is also contemplated that the first and second linkage assemblies 84 and 86 of the second servo-drive apparatus 80 may be replaced by first and second ball screw devices (not shown) which are coupled to the second servomotor device 82 and to the first and second seal bar assemblies 60 and 70 for effecting vertical movement of the seal bar assemblies 60 and 70 toward and away from one another.

What is claimed is:

1. A process for creating a heat seal in polymeric film packaging material located between adjacent bundles of one or more shingles comprising the steps of:

providing a support frame;

providing a conveyor system associated with said support frame;

providing a plurality of spaced-apart bundles of one or more shingles to said conveyor;

moving said bundles via said conveyor along a first path extending from a first portion of said support frame to a second portion of said support frame, said spaced-apart bundles being at least partially wrapped in polymeric film material as they move along said first path such that sections of said film material extend between adjacent, spaced-apart bundles; and, effecting a heat seal in one of said sections of said polymeric film material located between the adjacent bundles via a heat seal device, said heat seal device including a carriage, first servo-drive apparatus for effecting movement of said carriage back and forth along at least a portion of said first path, a first seal bar assembly mounted on said carriage for movement toward and away from said first path, second servo-drive apparatus for effecting movement of said first seal bar assembly toward and away from said first path, and processor apparatus for controlling the operation of said first and second servo-drive apparatuses.

2. A process as set forth in claim 1, wherein said heat seal device further includes a second seal bar assembly mounted on said carriage for movement toward and away from said first path, and said heat seal formed in said one section of said polymeric film material is effected via said first and second seal bar assemblies.

3. A process as set forth in claim 2, wherein said second servo-drive apparatus comprises a second servomotor device and first and second linkage assemblies which are coupled to said second servomotor device and said first and second seal bar assemblies for effecting movement of said first and second seal bar assemblies toward said first path such that said heat seal is formed in said one section.

4. A process as set forth in claim 1, further comprising the step of causing one or more of said bundles which are positioned downstream from said heat seal device to dwell to allow slack to occur within said one section of said polymeric film material to be heat sealed.

5. A process as set forth in claim 1, wherein said heat seal is effected in said one section of said polymeric film material by moving said first seal bar assembly toward said first path at an angle of about 90° to said first path.

6. A process as set forth in claim 1, wherein said heat seal is effected in said one section of said polymeric film material by moving said first seal bar assembly toward said first path at an angle of about 45° to said first path.

7. A process for creating a heat seal in polymeric film packaging material located between adjacent bundles of one or more workpieces comprising the steps of:

providing a support frame;

providing a conveyor system associated with said support frame;

providing a plurality of spaced-apart bundles of one or more workpieces to said conveyor;

moving said bundles via said conveyor along a first path extending from a first portion of said support frame to a second portion of said support frame, said spaced-apart bundles being at least partially wrapped in polymeric film material as they move along said first path such that sections of said film material extend between adjacent, spaced-apart bundles; and, effecting a heat seal in one of said sections of said polymeric film material located between the adjacent bundles via a heat seal device, said heat seal device including a carriage, first servo-drive apparatus for effecting movement of said carriage back and forth along at least a portion of said first path, a first seal bar assembly mounted on said carriage for movement toward and away from said first path, second servo-drive apparatus for effecting movement of said first seal bar assembly toward and away from said first path, and processor apparatus for controlling the operation of said first and second servo-drive apparatuses.

8. A process as set forth in claim 7, wherein said heat seal device further includes a second seal bar assembly mounted on said carriage for movement toward and away from said first path, and said heat seal formed in said one section of said polymeric film material is effected via said first and second seal bar assemblies.

9. A process as set forth in claim 8, wherein said second servo-drive apparatus comprises a second servomotor device and first and second linkage assemblies which are coupled to said second servomotor device and said first and second seal bar assemblies for effecting movement of said first and second seal bar assemblies toward said first path such that said heat seal is formed in said one section.

10. A process as set forth in claim 7, further comprising the step of causing one or more of said bundles which are positioned downstream from said heat seal device to dwell to allow slack to occur within said one section of said polymeric film material to be heat sealed.

11. A process as set forth in claim 7, wherein said heat seal is effected in said one section of said polymeric film material by moving said first seal bar assembly toward said first path at an angle of about 90° to said first path.

12. A process as set forth in claim 7, wherein said heat seal is effected in said one section of said polymeric film material by moving said first seal bar assembly toward said first path at an angle of about 45° to said first path.

13. A process for creating a heat seal in polymeric film packaging material located between adjacent bundles of one or more workpieces comprising the steps of:

providing a support frame;

providing a conveyor system associated with said support frame;

providing a plurality of spaced-apart bundles of one or more shingles to said conveyor;

moving said bundles via said conveyor along a first path extending from a first portion of said support frame to a second portion of said support frame, said spaced-apart bundles being at least partially wrapped in polymeric film material as they move along said first path such that sections of said film material extend between adjacent, spaced-apart bundles; and, effecting a heat seal in one of said sections of said polymeric film material located between the adjacent bundles via a heat seal device, said heat seal device including a carriage which moves along said first path, a first seal bar assembly mounted on said carriage for movement toward and away from said first path, servo-drive apparatus for effecting movement of said carriage back and forth along said first path and for effecting movement of said first seal bar assembly toward and away from said first path, and processor apparatus for controlling the operation of said servo-drive apparatus.

14. A process as set forth in claim 13, wherein said heat seal device further includes a second seal bar assembly mounted on said carriage for movement toward and away from said first path, and said heat seal formed in said one section of said polymeric film material is effected via said first and second seal bar assemblies.

15. A process as set forth in claim 14, wherein said second servo-drive apparatus comprises a second servomotor device and first and second linkage assemblies which are coupled to said second servomotor device and said first and second seal bar assemblies for effecting movement of said first and second seal bar assemblies toward said first path such that said heat seal is formed in said one section.

16. A process as set forth in claim 13, further comprising the step of causing one or more of said bundles which are positioned downstream from said heat seal device to dwell to allow slack to occur within said one section of said polymeric film material to be heat sealed.

17. A process as set forth in claim 13, wherein said heat seal is effected in said one section of said polymeric film material by moving said first seal bar assembly toward said first path at an angle of about 90° to said first path.

18. A process as set forth in claim 13, wherein said heat seal is effected in said one section of said polymeric film material by moving said first seal bar assembly toward said first path at an angle of about 45° to said first path.

* * * * *